June 22, 1948.   R. J. DUNLAVEY   2,443,950
FILM GUIDING AND RETAINING MECHANISM
Filed May 6, 1946   2 Sheets-Sheet 1
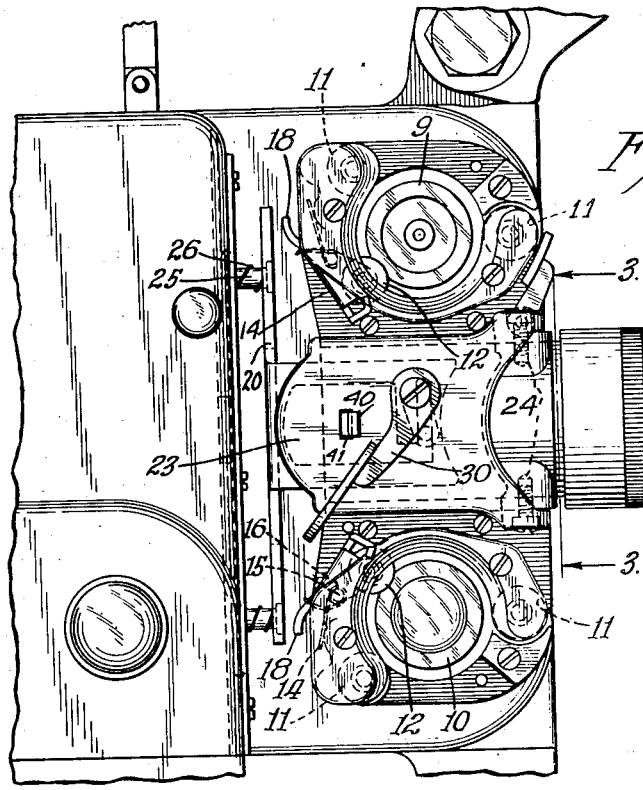
Fig. 1.
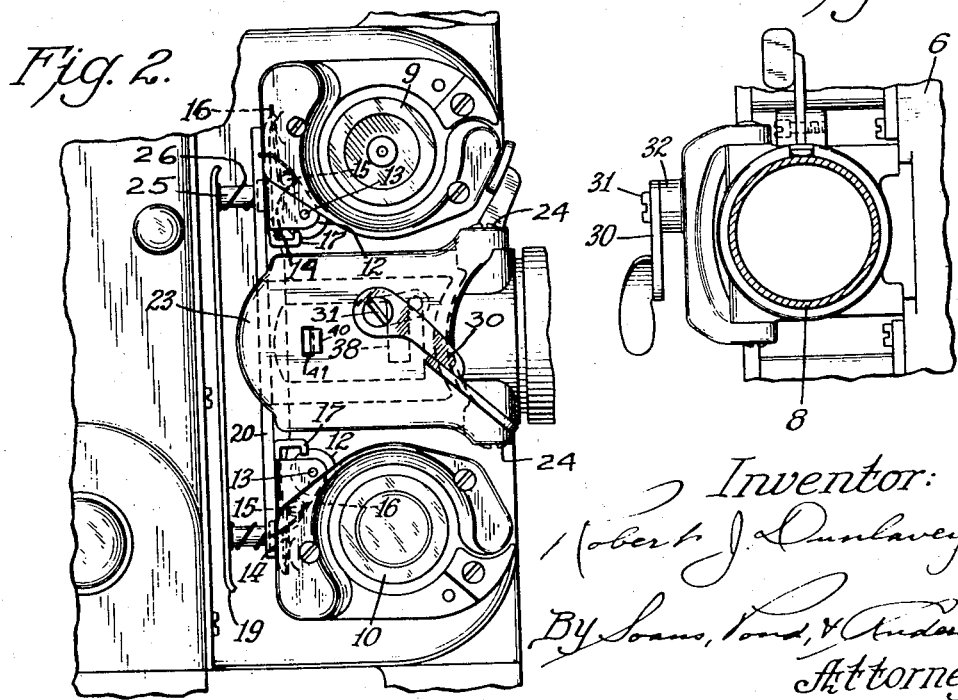
Fig. 2.
Fig. 3.
Inventor:
Robert J. Dunlavey
By Soans, Pond, & Anderson
Attorneys June 22, 1948.　　　　R. J. DUNLAVEY　　　　2,443,950
FILM GUIDING AND RETAINING MECHANISM Filed May 6, 1946　　　　　　　　　　　　2 Sheets-Sheet 2

Inventor:
Robert J. Dunlavey
By Soans, Pond, & Anderson,
Attorneys

Patented June 22, 1948

2,443,950

UNITED STATES PATENT OFFICE 2,443,950

FILM GUIDING AND RETAINING MECHANISM

Robert J. Dunlavey, Chicago, Ill., assignor to Ampro Corporation, Chicago, Ill., a corporation of Illinois Application May 6, 1946, Serial No. 667,684

7 Claims. (Cl. 88—17)

1

This invention relates to the film guiding and retaining means of cinematographs, including motion picture cameras and projectors.

Cinematographs generally include a casing having a wall provided with a film guideway through which the film is fed intermittently by means including a feed sprocket, a take-up sprocket, and a reciprocating claw. The film is retained in operative relation to the guideway and claw by means of a gate having a yieldable friction shoe, and it is retained in operative relation to the sprockets by guide rollers. The shoe and guide rollers are retractable to permit insertion and removal of the film. A cinematograph of this general description is shown in Morgan and Dearborn Patent No. 2,390,893, dated December 11, 1945. In that construction, the guide rollers are automatically retracted by movement of the shoe away from the guideway.

With constructions heretofore in use, the film gate was usually supported on the lens mounting and in order to properly clean and adjust the pressure of the shoe, it was necessary to remove the entire unit, including the mounting.

The main objects of this invention are to provide a cinematograph having improved film retaining means for positioning the film in proper operative position with respect to the guideway and the film sprockets; to provide an improved form of film gate; to provide improved manually operable means for closing and opening the gate to position its pressure shoe into and out of operative relation with respect to the film guideway; to provide adjustable means for limiting the closing movement of the gate for varying the pressure exerted by the shoe on the film; to provide an improved mounting for the gate which will permit the entire gate and its shoe to be moved to one side of the cinematograph where they are readily accessible for cleaning and adjustment; and to provide a film retaining mechanism for cinematographs wherein the film guide rollers are automatically retracted and moved into operative position through the movement of the gate.

An illustrative embodiment of this invention is shown in the accompanying drawings, wherein:

Figure 1 is a fragmentary side elevation of a cinematograph to which is applied an improved film guiding and retaining mechanism, showing the film gate and guide rollers in operative position.

Figure 2 is a view similar to Figure 1, but show-

2 ing the gate and guide rollers retracted to permit insertion or removal of the film.

Figure 3 is a transverse vertical section taken on the line 3—3 of Figure 1.

Figure 4:
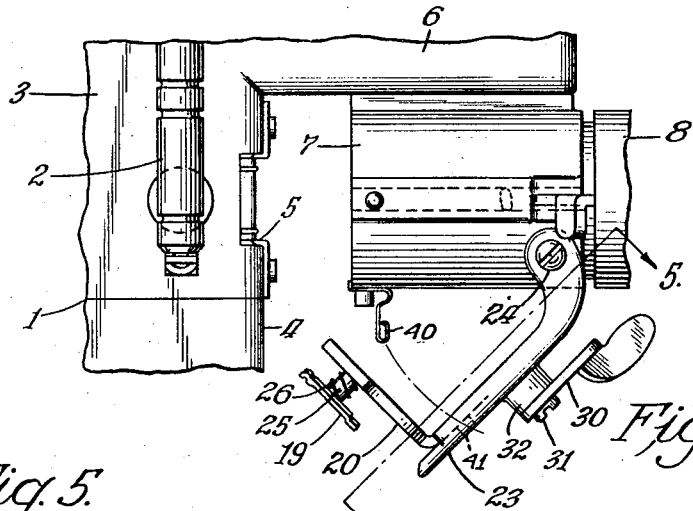

Figure 4 is a fragmentary top plan view showing the gate moved partly to one side of the lens mounting.

Figures 5, 6:
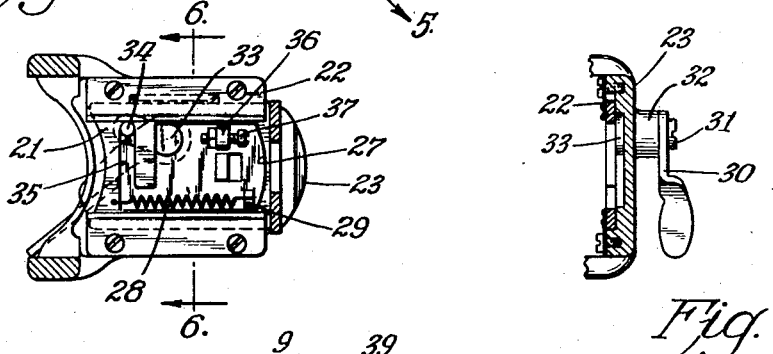

Figure 5 is a longitudinal vertical section of the gate and its mounting, taken on the line 5—5 of Figure 4.

Figure 6 is a transverse vertical section of the gate and its mounting, taken on the line 6—6 of Figure 5.

Figure 7:
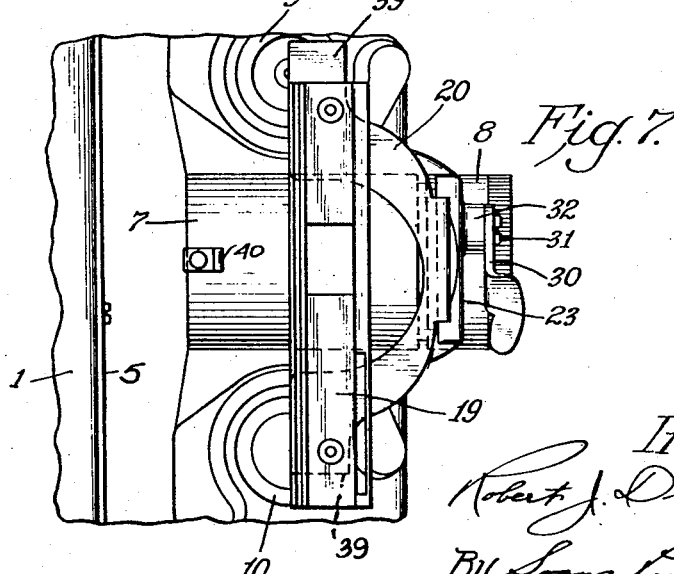

Figure 7 is a fragmentary side elevation of the device, showing the gate fully open, with the pressure shoe at right angles to its operative position so as to facilitate its cleaning or adjustment.

In the construction shown, the invention is applied to a motion picture projector. Inasmuch as the invention relates particularly to the film guiding and retaining mechanism, the accompanying drawings show only as much of the projector as will be of assistance in understanding the invention.

As herein shown, the projector comprises an upright casing 1 having a handle 2 mounted on its top wall 3, and a front wall 4 provided with the usual film guideway 5, and a gear housing 6 which extends forwardly for supporting a lens mounting 7 and the film guiding and retaining mechanism.

The lens mounting 7, which supports a lens 8, is similar in construction to that forming the subject of my copending application Serial Number 667,685, filed May 6, 1946.

Mounted above and below the lens are the usual feed and take-up sprockets 9 and 10, respectively, and located adjacent each sprocket is a pair of guide rollers 11 on fixed axes, and a film retaining roller 12 on a movable axis as fully described in said Morgan and Dearborn Patent No. 2,390,893.

Each of the rollers 12 is mounted on a pin 13 supported in a carriage 14 having a hinge pin 15 embraced by a helical spring 16 which normally rocks the carriage into position for pressing the film against the cooperating sprocket. The carriage has a finger 17 to permit manual operation and a cam 18 for operation by the improved film gate.

In the construction shown, the improved film gate comprises a pressure shoe 19 yieldably mounted on an arcuate bracket 20 having a portion thereof bent at right angles to form a tongue 21 which is slidably mounted in a guideway 22 formed on an arm 23 which is pivotally secured to the lens mounting by pins 24.

The shoe 19 has forwardly extending pins 25 slidably supported in the bracket. Embracing these pins are helical springs 26 which normally urge the shoe away from the bracket to exert pressure on the film.

Formed in the tongue 21 is an opening 27 to accommodate a spiral spring 28 having its forward end fastened to the tongue and its rear end fastened to a lug 29 on the arm 23 for normally urging the bracket rearwardly to position the pressure shoe in operative relation to the film guideway 5.

The gate is manually retracted by means of a lever 30 having a pivot pin 31 supported in a boss 32 on the outer face of the arm 23. Secured to the inner end of the pin 31 is an arm 33 provided with a stud 34 which rides in a slot 35 formed in the tongue 21 whereby the gate may be retracted against the action of the spring 28 when the lever 30 is moved counterclockwise.

Mounted on a boss 36 on the inner face of the arm 23, is an adjusting screw 37 adapted to engage a shoulder 38 on the tongue 21 for limiting the outward movement of the gate. By this means it is possible to adjust the pressure which the shoe 19 exerts on the film.

On the upper and lower extremities of the arcuate bracket 20, are bearing parts 39 for engaging the cams 18 of the carriages 14 whereby the carriages are rocked to retract the film retaining rollers 12 when the gate is retracted.

Mounted on the outer side of the lens mounting is a spring clip 40 which is adapted to engage an aperture 41 in the supporting arm 23 for locking the arm in its closed position so as to position the gate and its shoe directly in front of the film guideway.

In operation, the parts normally occupy the positions shown in Figure 1. To permit insertion or removal of the film, the lever 30 is shifted counterclockwise, thereby retracting the gate so as to move the shoe 19 away from the guideway 5 and simultaneously rocking the carriages 14 so as to retract the film retaining rollers 12, as shown in Figure 2.

While the gate is in the retracted position, it may be shifted laterally of the lens mounting by releasing the spring clip 40. The lever 30 may be used as a handle for shifting the arm 23 outwardly to the position shown in Figure 7. In this position, the gate is readily accessible to permit cleaning of the shoe and adjustment of the screw 37.

When the arm 23 is again closed, the bearing parts 39 of the gate engage the cams 18 of the carriages 14 to retract the retaining rollers 12.

Although but one specific embodiment of this invention has been herein shown and described, it will be understood that details of the construction shown may be altered without departing from the spirit of the invention as defined by the following claims.

I claim:

1. A cinematograph comprising a casing having a film guideway, a lens mounting supported on said casing in front of said guideway, a film gate having a pressure shoe for retaining the film in the guideway, a movable support for said gate, said gate being slidably mounted on said support for movement axially of said lens mounting, means on said support normally urging said gate toward said guideway for positioning the shoe in operative relation to the film, and manually operable retracting and latching means on said support for retracting and holding said gate, said support being pivoted for swinging laterally of said casing for positioning said gate and shoe to one side of said mounting to permit access to said gate, and releasable means for securing the gate support against lateral swinging during operation of the retracting and latching means.

2. A cinematograph comprising a casing having a film guideway provided with a light aperture, a lens mounting on said casing in front of said guideway in axial alinement with the aperture, a film gate having a pressure shoe for retaining the film in the guideway, a movable support for said gate, said gate being slidably mounted on said support for movement axially of said lens mounting, a spring on said support normally urging said gate toward said guideway for positioning the shoe in operative relation to the film, an adjustable stop on said support for limiting the movement of said gate toward said guideway, and manually operable means on said support for retracting said gate against the action of said spring, said support being hinged on said lens mounting so as to permit said gate to be shifted to one side of said mounting for ready access to said shoe, spring, and stop.

3. A cinematograph comprising a casing having a film guideway provided with a light aperture, a lens mounting on said casing in front of said guideway in axial alinement with the aperture, a film gate having a pressure shoe for retaining the film in the guideway, a movable support for said gate, said gate being slidably mounted on said support for movement axially of said lens mounting, a spring on said support normally urging said gate toward said guideway for positioning the shoe in operative relation to the film, an adjustable stop on said support for limiting the movement of said gate toward said guideway, manually operable means on said support for retracting said gate against the action of said spring, said support being hinged on said lens mounting whereby said gate may be shifted to one side of said mounting to permit ready access to said shoe, spring, and stop, and cooperating latch means on said lens mounting and support for locking said support in closed position.

4. A cinematograph comprising a casing having a film guideway provided with a light aperture, a lens mounting supported on said casing in front of said guideway in axial alinement with the aperture, film feed and take-up sprockets on respectively opposite sides of said mounting, film retaining rollers adapted to press the film against said sprockets, carriages for supporting said rollers and normally urging said rollers into operative relation to the sprockets, a film gate having a pressure shoe for retaining the film in the guideway, a movable support for said gate, said gate being slidably mounted on said support for movement axially of said lens mounting to permit insertion and removal of the film, said support being movable laterally of said mounting for positioning said gate and shoe to one side of said mounting to permit ready access to said gate, and cooperating bearing parts on said gate and roller carriages whereby said carriages are shifted for retracting said rollers through the retraction of said gate.

5. In a cinematograph that includes a casing having a film guideway provided with a light aperture, and a lens mounting on said casing in front of said guideway in axial alinement with the aperture; a film gate support pivotally mounted on an axis spaced to one side of and in angular relation to the axis of the lens mount at a point spaced along said mount from the end thereof that is adjacent the guideway, said support comprising a track extending axially along the mount on the same side as the pivot axis, and a gate arranged to cooperate with the guideway and having a portion slidably engaging said track.

6. In a cinematograph that includes a casing having a film guideway provided with a light aperture, and a lens mounting on said casing in front of said guideway in axial alinement with the aperture; a film gate support extending axially alongside the lens mount and pivotaly mounted at a point spaced along the lens mount from the end thereof that is adjacent the guideway for swinging movement away from the lens mount, a track carried by said support and extending axially of said mount, a gate having a supporting portion projecting alongside the lens mount and slidably engaged in said track, and means carried by said pivotally mounted gate support and engaging said projecting portion of the gate for controlling the axial position of the gate.

7. In a cinematograph that includes a casing having a film guideway provided with a light aperture, a wall extending forwardly of said guideway and to one side thereof, and a lens mount alongside said wall in front of said guideway and in axial alinement with the aperture; a gate support comprising a plate extending axially along the outer side of the lens mount and pivotally mounted at a point spaced from the end of said mount that is adjacent the guideway for swinging movement away from said outer side, a gate having a projecting portion slidably engaging the trackway, and means arranged between said plate and lens mount for controlling the axial position of the gate.

ROBERT J. DUNLAVEY.

REFERENCES CITED

The following references are of record in the file of this patent:

UNITED STATES PATENTS

| Number | Name | Date |
|---|---|---|
| 2,192,641 | Griffin et al. | Mar. 5, 1940 |

FOREIGN PATENTS

| Number | Country | Date |
|---|---|---|
| 9,864 | Great Britain | Apr. 26, 1909 |
| 499,629 | Great Britain | Jan. 26, 1939 |
| 637,888 | Germany | Nov. 5, 1936 |